Oct. 25, 1966  D. A. ANDERSON  3,281,161
TRAILER CARRIAGE AND TOWING ARRANGEMENT
Filed March 15, 1965  4 Sheets-Sheet 1
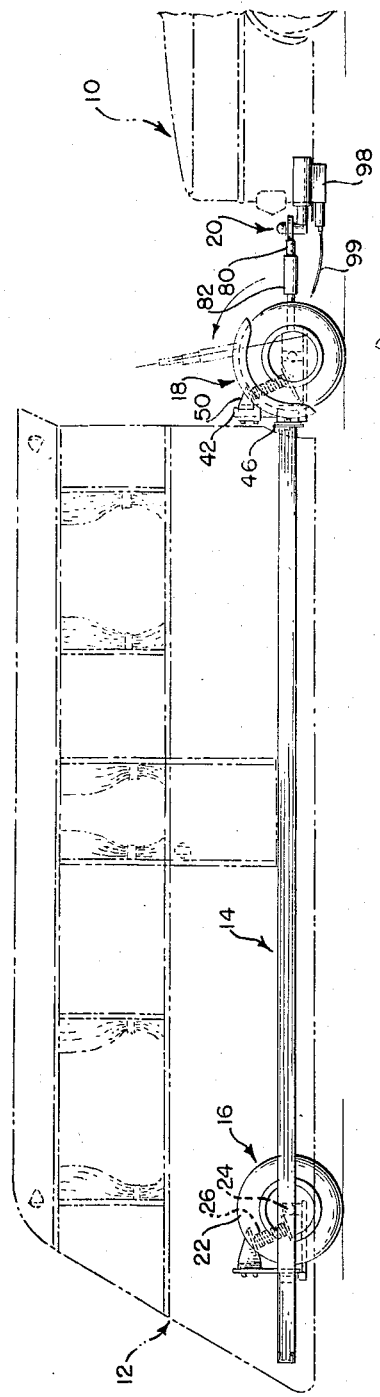
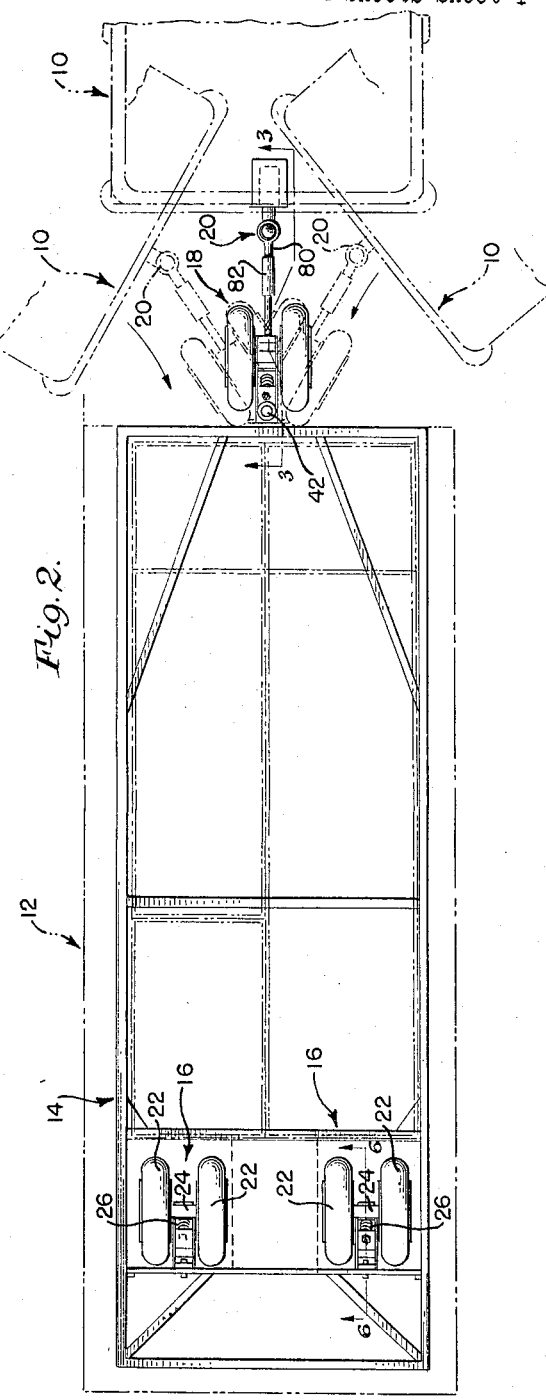
INVENTOR.
DELMAR A. ANDERSON
BY
Bean, Brooks, Buckley & Bean
ATTORNEYS

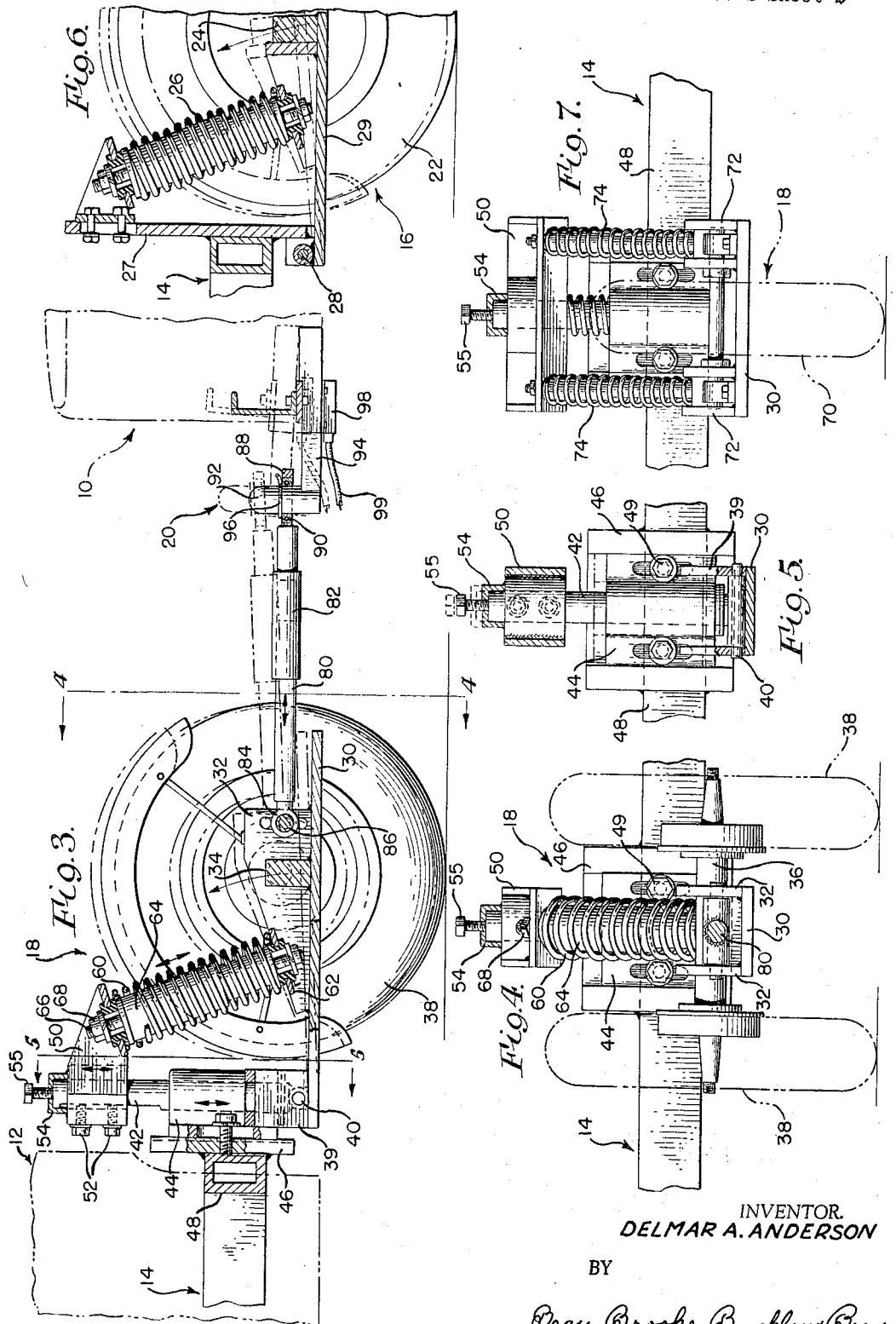

Oct. 25, 1966 D. A. ANDERSON 3,281,161
TRAILER CARRIAGE AND TOWING ARRANGEMENT
Filed March 15, 1965 4 Sheets-Sheet 3
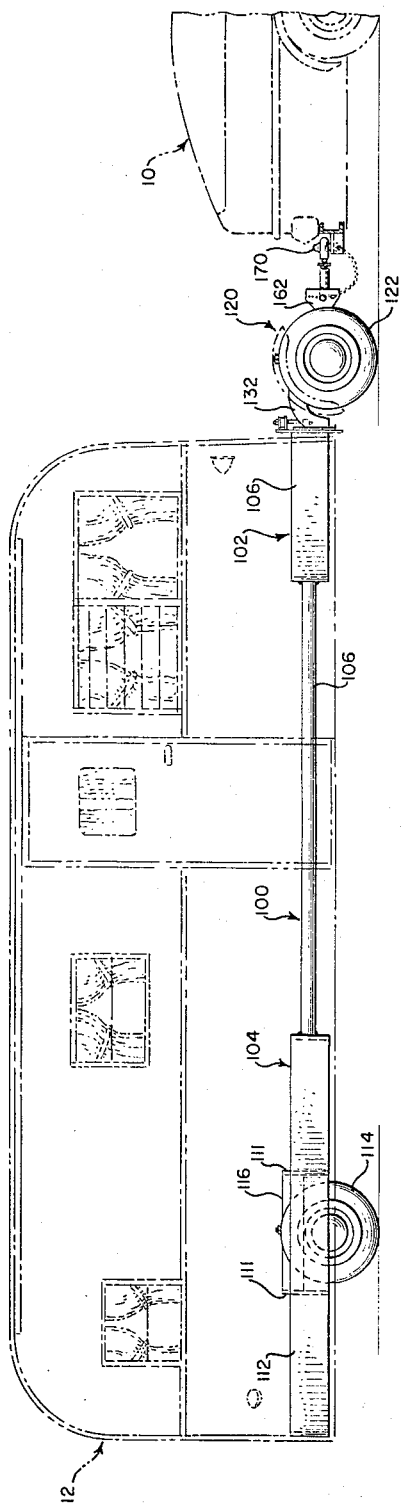
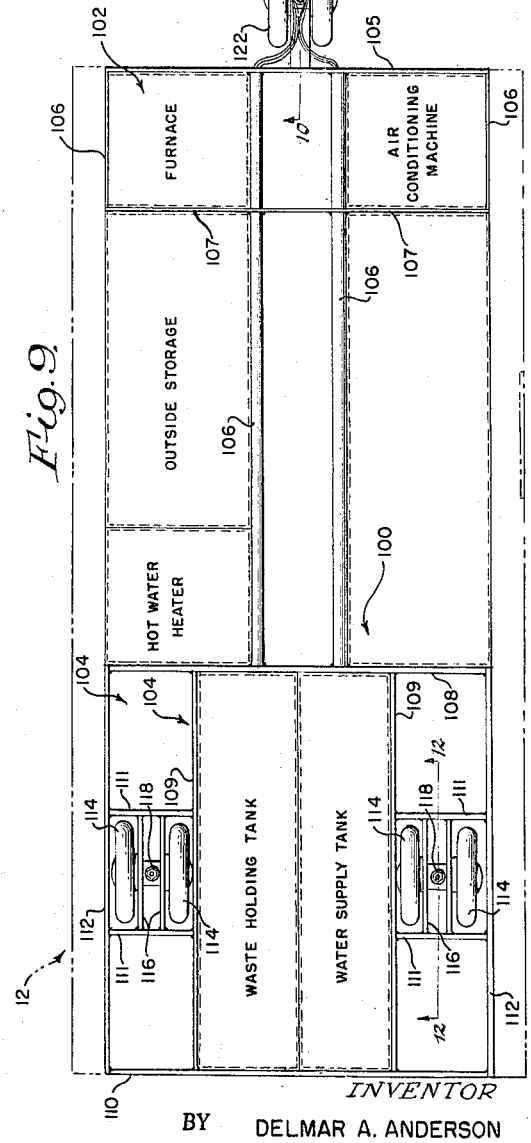
INVENTOR
DELMAR A. ANDERSON
BY
Bean, Brooks, Buckley & Bean
ATTORNEYS

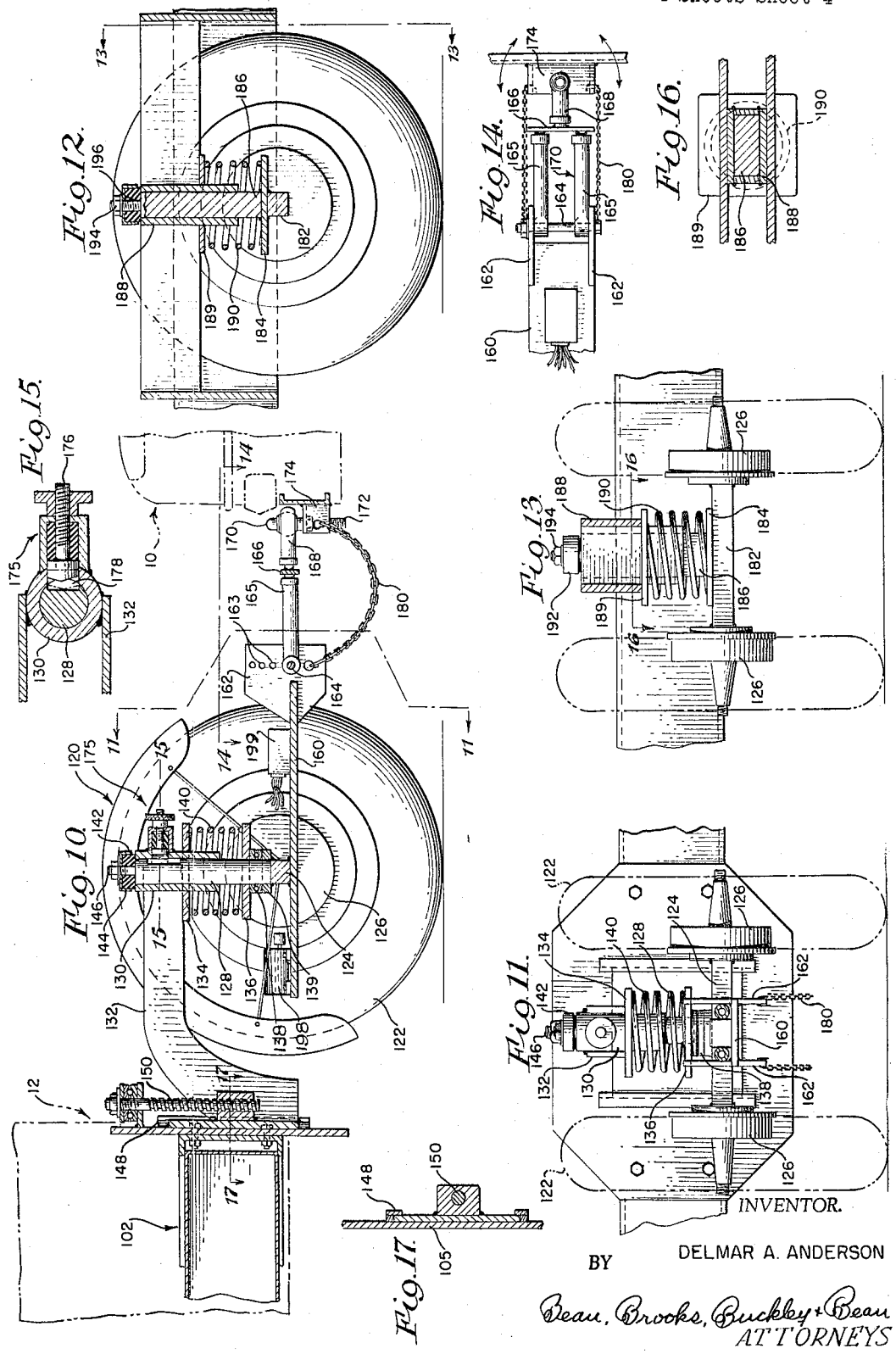

3,281,161
TRAILER CARRIAGE AND TOWING
ARRANGEMENT
Delmar A. Anderson, 6705 Transit Road, Buffalo, N.Y.
Filed Mar. 15, 1965, Ser. No. 439,818
6 Claims. (Cl. 280—476)

This invention relates to vehicle towing devices, and more particularly to an improved trailer carriage and towing arrangement therefor.

One of the objects of the invention is to provide an improved trailer carriage for towing behind a highway vehicle such as an automobile, truck, or the like.

Another object is to provide an improved combination trailer carriage and hitch mechanism for the purposes aforesaid.

Another object is to provide an improved trailer carriage and towing hitch device as aforesaid whereby to provide a system featuring improved trailing directional stability even under cross-wind travel conditions; maximum turning maneuverability; full freedom spring suspension capabilities; and improved overall safety and fail-proof operational characteristics.

Another object is to provide an improved device as aforesaid which is of structurally simple and rugged form, and easy to operate; while at the same time being relatively inexpensive to manufacture and maintain.

Another object is to provide an improved device as aforesaid which is readily adaptable with ease and facility to existent travel-trailer type devices.

Another object is to provide an improved device as aforesaid which, in addition to the other advantages set forth, minimizes need for any accessory "tandem wheel" type devices.

Another object of the invention is to provide an improved device as aforesaid which facilitates use of an overall silhouette design of reduced dimension while providing increased headroom interiorly of the transported "mobile home" or the like.

Another object is to provide an improved device as aforesaid which controls tendencies of such trailers to "surge" or "pitch" under highway travel conditions.

Another object is to provide an improved device as aforesaid which facilitates adjustments of the trailer front end height; whereby to minimize down-thrust on the hitch device, and road shock effects.

Another object is to provide a device as aforesaid which functions automatically and in improved manner to prevent "tow wander."

Another object is to provide an improved device as aforesaid which facilitates parking of the trailer, either manually or by connection to a hitch on the front bumper of an automobile or the like.

Another object is to provide an improved device as aforesaid which does not require the use of the conventional type frame or axle connected hitch bars or brackets which are cumbersome and heavy and expensive.

Another object is to provide a trailer system as aforesaid which embodies improved braking traction and safety characteristics.

Another object is to provide in a trailer carriage as aforesaid an improved support wheel system, allowing more flexibility in wheel location, thereby allowing more freedom in utilities placements.

Another object is to provide an improved device as aforesaid which makes more practicable the towage of travel trailers or the like by means of the currently popular, relatively small or "compact" size automobiles.

Other objects and advantages will be apparent from the following specification and the accompanying drawing wherein:

FIG. 1 is a side elevational view of a carriage and towing hitch assembly of the invention, illustrating its application by way of example to the transport of a "mobile home" by means of a conventional automobile;

FIG. 2 is a top plan view of the mechanism of FIG. 1;

FIG. 3 is an enlarged scale fragmentary sectional view taken as suggested by line 3—3 of FIG. 2;

FIGS. 4, 5 are fragmentary sectional views taken as suggested by lines 4—4 and 5—5, respectively, of FIG. 3;

FIG. 6 is an enlarged scale sectional view taken as suggested by line 6—6 of FIG. 2;

FIG. 7 is a view corresponding to FIG. 4 but showing use of a single wheel instead of a dual wheel arrangement;

FIG. 8 is a view corresponding to FIG. 1 but showing a modified form of carriage and hitch construction of the invention;

FIG. 9 is a top plan view of the construction of FIG. 8;

FIG. 10 is an enlarged scale fragmentary sectional view taken as suggested by line 10—10 of FIG. 9;

FIG. 11 is a fragmentary sectional view taken as suggested by line 11—11 of FIG. 10;

FIG. 12 is an enlarged scale fragmentary sectional view taken as suggested by line 12—12 of FIG. 9; and FIGS. 13, 14, 15, 16, 17 are fragmentary sectional views taken as suggested by lines 13—13, 14—14, 15—15, 16—16, 17—17 of FIGS. 12, 10, 10, 13 and 10, respectively.

As shown by way of example in the drawing at FIGS. 1–7 herewith, the invention may be embodied in a mechanism designed to be towed by an automobile or the like as indicated at 10, for carrying a "mobile home" or the like as indicated at 12. The mechanism of the invention comprises generally, in combination, a carriage frame as indicated at 14; rear support wheel units as indicated at 16—16; a front support wheel unit 18, and a "hitch" unit as designated generally at 20. The rear wheel units 16—16 may be of any suitable single or multiple wheel type, and the wheels 22 thereof are of course carried by directionally fixed axles 24 and are preferably spring-suspended as indicated at 26 (FIGS. 1, 2, 6) by means of a face plate 27 welded to the carriage frame and carrying a pivot pin 28 upon which is mounted the rear end of a base plate 29 carrying the wheel axle 24 and the lower end of the spring unit 26.

The frame unit 14 may comprise any desired fabrication of structural framing devices, and metal or wood or plastic or fiber glass surface panel portions, as may be preferred. This is to provide a generally flat platform or frame upon which any desired load may be mounted and transported, such as the "mobile home" as indicated at 12 in the drawing herewith. Thus, it will be appreciated that the frame unit 14 and the structure supported thereon may incorporate any desired functional components; such as for example, tank components useful for dishwashing sink, bathing shower, and toilet purposes; as well as for drinking water storage, cooking and heat supply gas storage purposes, and the like.

More specifically, the front support wheel unit 18 as shown in FIGS. 3, 4, 5, includes a base plate 30 having welded thereto a pair of parallel upstanding side plates 32, 32 supporting therebetween an abutment 34 through which extends the wheel axle 36. The axle 36 mounts a pair of wheels 38 in parallel arrangement at opposite sides of the cradle fromed by the base plate 30 and the side plates 32, 32. At its rear end the base plate 30 is formed with upstanding side walls 39 receiving the opposite ends of a bearing pin 40 (FIGS. 3, 5) which extends transversely from the bottom end of a steel post 42. The post is journaled in a bearing block 44 bolted to a face plate 46 carried by the front cross frame member 48 of the carriage platform 14. As shown in the drawing herewith, the bearing block is vertically slotted to receive clamping bolts 49 whereby the block is vertically adjustable on the face plate.

At its upper end the post 42 supports a bracket 50 which is clamped to the post by means of machine screws 52 so as to be positionally adjustable on the post in vertical directions. A screw jack device as indicated at 54 is preferably provided at the top of the bracket 50 and fitted with a machine screw 55 threaded into the housing 54 to facilitate vertical adjustments of the bracket 50 on the post 42. The bracket 50 mounts one end of a spring suspension device including a compression spring 60, the lower end of which bears against a pad portion 62 carried by the walls 32, 32 of the cradle 30. The compression spring is preferably fitted over a telescopic sleeve unit 64, and a tie rod 66 extends through the assembly to maintain it is operative position by means of nuts 68, 68 at the upper and lower ends of the rod.

Thus, it will be seen that the front wheel mount unit provides a flexible parallelogram truss arrangement wherein the bottom plate 30 which mounts the wheel axle is pivoted at pin 40 so as to be free to oscillate up and down except as restrained by action of the compression spring 60; and that the action of the spring may be controlled by adjustments of the vertical position of the bracket 50 on the post 42. At all times the post 42 is freely rotatable in the bearing block 44, thus permitting the wheel unit to pivot about the vertical axis of the post 42 incidental to travel directional changes.

Whereas the construction shown in FIGS. 3, 4, 5, provides for the use of dual wheels 38, 38, it is to be understood that the wheel unit may in lieu thereof employ only a single wheel as indicated at 70, FIG. 7. In this case the bottom plate 30 mounts a pair of brackets 72—72 at opposite sides thereof to engage a pair of spring suspension components 74, 74, each of which is of a construction similar to the spring suspension component shown in FIGS. 3, 4. Similarly, the top bracket 50 is extended laterally to accommodate the upper ends of the spring suspension components.

The hitch device in the case of the present invention may comprise a simple push-pull strut 80 which will preferably include a preloaded (in both directions) resilient unit 82 to cushion the towing action. Thus, the unit 82 may comprise any suitable spring or air or oil cylinder or rubber tension-compression device, or the like; such as will provide resiliency in both directions to damp towing shocks. At its rear end the strut 80 includes a cylindrical bearing device as indicated at 84 (FIG. 3) for engagement with a pin 86 carried by the cradle structure 30, 32. The pair of plates 32 of the cradle are provided with corresponding vertical rows of holes, as shown in FIGS. 3 and 4, to receive the pin 86 in any selected pair thereof. At its front end the strut 80 is provided with an enlarged eye 88 (FIG. 3) enclosing a ball bearing as indicated at 90 for slip-fitted engagement upon a post 92 extending upwardly from a bracket 94 which is bolted to the rear of the towing vehicle frame. Thus, the tow bar 80 is simply slip-fitted at its forward end down upon the post 92, and preferably locked thereat such as by means of a lock washer 96. An electric connection box is conveniently carried by the tow bracket 94, as indicated at 98, for plugging connections by means of a cable 99 for carrying current to the lighting, brake and utility systems.

As shown in FIGS. 8, 9, the carriage frame may preferably be constructed as indicated generally at 100 to comprise a front module 102 of open top box form interconnected to a rear module 104 by means of a pair of parallel tubular struts 106—106. The module 102 may be conveniently framed up out of metal plates 105, 106, 107 welded together at the corners and to the tubes 106, 106 wherever contiguous. Similarly, the frame module 104 may be fabricated of metal plates 108, 109, 110, 111, 112, as shown in FIGS. 8, 9. The tubes 106—106 thus provide efficient "torsion beam" type structural members for the carriage frame, adapting it to the traverse undulant and otherwise irregular road surfaces with utmost facility. At the same time the hollow interiors of the tube 106—106 may be employed to convey wiring and plumbing lines and/or to act as air conditioning conduits from one end of the carriage to the other. The areas blocked out within the carriage frame platform as shown in FIG. 9 for instance, are particularly adapted to accommodate in modular-nested relation the various accessory equipment and storage arrangements as illustrated by way of example therein. Suspension supports for the carriage rear wheels 114 are conveniently provided for by welding plates 116 in-between the frame plates 111—111, and then mounting wheel suspension units 118 thereunder, which may be of coil spring cushion form, or the like. The front end of the carriage is supported by a swivelable wheel unit 120, as will be described in fuller detail hereinafter.

The carriage front end wheel unit 120 preferably includes dual wheels 122, 122 carried by an axle 124 and each fitted with a disc or band brake device as shown at 126. As shown in FIGS. 10, 11, the axle 124 is welded to a vertical swivel post 128 which is telescopically journalled in a sleeve 130 which is fixed as by welding to the forward end of a horn 132. A bearing plate 134 is fixed to the sleeve 130 below the horn 132, and an opposite bearing plate 136 is supported by means of a thrust bearing 138 seated on a collar 139 (FIG. 10) which rests on the axle 124. A compression spring 140 is disposed between the plates 134, 136, and thus it will be appreciated that the weight of the front end of the carriage will be transmitted to the wheel unit 120 through the spring 140. Rebound loads tending to lift the horn 132 relative to the wheel unit are restrained by means of a cap 142 holding a wearing washer 144 of urethane, rubber, or the like, which bears down upon the upper end of the sleeve 130. The cap 142 is vertically adjustable on the post 128 by means of a screw and nut device as shown at 146, whereby the tension on the spring 140 may be adjusted at will to regulate the riding qualities of the carriage. The rear end of the horn 132 is connected to the frame of the carriage by means of a vertically adjustable slideway 148 (FIG. 10) and a screw 150 which is manually operable to shift the horn vertically on the frame, thereby providing for fine adjustments of the carriage bed angle and balance.

The axle 124 is fixed as by welding to a pull plate 160 (FIGS. 10, 11, 14) which extends forwardly into connection with a pair of cheek plates 162—162 which are punched or drilled to provide vertical rows of holes 163 into any selected pair of which a pull pin 164 is inserted to engage the rear ends of a pair of resilient hitch devices 165—165. The devices 165—165 may be air or oil cylinders, or spring or rubber cushion devices of any suitable form to provide in any event resilient hitch means adapted to transient pulling-braking loads to the carriage while at the same time damping out any shock loads imposed thereon. At their front ends, the hitch members are interconnected by means of a cross plate 166 to which is fixed a hitch socket member 168 having a spherical socket portion adapted to slip-fit and lock upon a knob 170 forming the top end of a threaded pin 172 (FIG. 10). The pin 172 is thereby vertically adjustable in a bracket 174, which is welded to the rear end of the towing vehicle 10. Hence, it will be appreciated that the front end of the hitch unit 165—165 is vertically adjustable to the tow vehicle; the swivel post 128 is vertically adjustable relative to the horn 132; and the horn is vertically adjustable relative to the front end of the carriage. This feature permits of a variety of adjustment combinations to suit different vehicle dimensionings and loadings and road conditions.

Note that, as shown in FIGS. 10, 15, a lock device is furnished as indicated at 175 to comprise a screw 176 adapted to be manually turned so as to thrust its inner end portion into a keyway type slot 178. Whereas the screw 176 is normally kept retracted to avoid interfering with free rotation of the post 128 in the sleeve 130, whenever it is desired to "back" the carriage, such as into a designated parking space, this maneuver will be greatly facilitated by first "locking" the screw 176 so as to immobilize the swivel. Also, note that as an added safeguard, it is preferred to hook one or more side chains as indicated at 180 to extend loosely between the brackets 162–174 so as to safeguard the connection even though the socketed hitch bar 168 might pull free from the knob 170.

As shown in FIGS. 12, 13, 16, the carriage rear wheel units preferably comprise each an axle 182 carrying a bearing plate 184; a squared post 186, and a complementary-shaped sleeve 188. A top bearing plate 189 is welded to the sleeve, and a compression spring 190 is disposed between the two plates. A cap piece 192 is carried by a nut and screw extension 194 at the top of the post 186; and a rubber or urethane washer 196 is disposed thereunder to permit of manual adjustment of the tension on the spring 190 for regulating the carriage "ride."

As shown in FIG. 10, the support plate 160 is extended rearwardly to provide means for mounting thereon a generator or alternator as indicated at 198, for generating electricity for operating the lighting and other facilities of the trailer. A suitable storage battery will of course also be carried by the trailer to store electricity while the trailer is in transit. The generator or alternator may be driven in any preferred manner from any part of the trailer wheel mechanism which rotates as the trailer travels. For example, as shown in FIG. 10 herewith, the generator is illustrated to be driven by a rubber-faced pulley which is arranged to roll in frictional engagement against a side wall portion of one of the wheel rims. It will of course be understood that suitable automatic overload controls and the like will be arranged in conjunction with the generator system, as is well known in the art. Also, as illustrated at 199 (FIG. 10), an electrical junction box may be conveniently mounted upon the front end of the support plate 160; being thereby adapted to detachably receive conduit plug-ins from the tractor vehicle, in lieu of the mounting arrangement of the junction box 98 as shown in FIGS. 1, 3.

Thus it will be appreciated that although only a few forms of the invention have been illustrated and described in detail hereinabove, various changes may be made therein without departing from the spirit of the invention or the scope of the following claims.

I claim:

1. In a trailer carriage comprising a vehicle frame supported by ground wheel means and adapted to be hitched to a towing vehicle, the improvement comprising in combination, a forwardly extending first bracket member carried by the front end portion of said vehicle frame and connected thereto by means permitting manual adjustments of the vertical position of said first bracket relative to said frame, a post member journalled in the front end portion of said first bracket to extend vertically downwardly therefrom while being rotatable therein, a base plate pivotally fixed to the lower end of said post to extend forwardly therefrom and having a wheel axle fixedly connected thereto to extend transversely of said base plate and beyond the opposite sides thereof, road wheels mounted on the opposite extending ends of said axle, a second bracket mounted on the upper end of said post member and vertically adjustable thereon, compression spring means disposed between said base plate and said second bracket to permit cushioned vertical movements of said base plate relative to said post member, a pair of vertical standing plates fixedly attached to the front end of said base plate and having a plurality of vertically aligned apertures therethrough, a tow bar carrying a cross pin at its rear end for selective slip-fitted connections into any of said apertures thereby regulating the height of the rear end of the tow bar relative to said base plate, bearing means carried by the front end of said tow bar for journalled connection upon a tow hook carried by the towing vehicle, said tow bar including an elastic shock absorbing component.

2. In a trailer carriage comprising a vehicle frame supported by ground wheel means and adapted to be hitched to a towing vehicle, the improvement comprising in combination, a forwardly extending bracket member carried by the front end portion of said vehicle frame and connected thereto by means permitting manual adjustments of the vertical position of said bracket relative to said frame, a post member journalled in the front end portion of said bracket to extend upwardly and downwardly therefrom while being rotatable therein, a base plate connected to the lower end of said post to extend forwardly therefrom and having a wheel axle connected thereto to extend transversely of said base plate and beyond the opposite sides thereof, road wheels mounted on the opposite extending ends of said axle, compression spring means disposed between said base plate and the upper end of said post member to permit cushioned vertical movements of said base plate relative to said bracket, vertically standing plate means fixedly attached to the front end of said base plate and having a plurality of vertically aligned apertures therethrough, a tow bar carrying means at its rear end for selective slip-fitted connections into any of said apertures thereby regulating the height of the rear end of the tow bar relative to said base plate and having means at its front end for connection to a towing vehicle, said tow bar including an elastic shock absorbing component.

3. In a trailer carriage comprising a vehicle frame supported by ground wheels and adapted to be hitched to a towing vehicle, the improvement comprising in combination, a forwardly extending first bracket member carried by the front end portion of said vehicle frame and connected thereto by means permitting manual adjustments of the vertical position of said first bracket relative to said frame, a post member journalled in said first bracket to extend vertically upwardly and downwardly therefrom while being rotatable therein, a base plate pivotally connected to the lower end of said post to extend forwardly therefrom and having a wheel axle fixedly connected thereto to extend transversely of said base plate, road wheel means mounted on said axle, a second bracket mounted on the upper end of said post member and vertically adjustable thereon, compression spring means disposed in an inclined attitude between said base plate and said second bracket to permit cushioned vertical pivoting movements of said base plate relative to said post member, a vertically standing plate means fixedly attached to the front end of said base plate and having a plurality of vertically aligned apertures therethrough, a tow bar having means at its rear end for selective slip-fitted connections into any of said apertures thereby regulating the height of the rear end of the tow bar relative to said base plate and means at the front end of said tow bar for connection to a towing vehicle, said tow bar including an elastic shock absorbing component.

4. In a trailer carriage comprising a vehicle frame supported by ground wheel means and adapted to be hitched to a towing vehicle, the improvement comprising in combination, a forwardly extending bracket member carried by the front end portion of said vehicle frame and connected thereto by means permitting manual adjustments of the vertical position of said bracket relative to said frame, a post member journalled in the front end portion of said bracket to extend upwardly and downwardly therefrom while being rotatable therein, a base plate carried by the lower end of said post to extend forwardly therefrom and having a wheel axle fixedly connected thereto to extend transversely of said base plate, road wheel means mounted on said axle, compression spring means disposed between said base plate and said bracket to permit cushioned movements of said base plate relative to said bracket, a pair of vertically standing plates fixedly attached to the front end of said base plate and having a plurality of vertically aligned apertures therethrough, a tow bar carrying means at its rear end for selective slip-fitted connections into any of said apertures thereby regulating the height of the rear end of the tow bar relative to said base plate, and bearing means carried by the front end of said tow bar for journalled connection upon a tow hook carried by the towing vehicle, said tow bar including an elastic shock absorbing component.

5. In a trailer carriage comprising a vehicle frame supported by ground wheel means and adapted to be hitched to a towing vehicle, the improvement comprising in combination, a forwardly extending beam member carried by the front end portion of said vehicle frame and connected thereto by means permitting manual adjustments of the vertical position of said beam relative to said frame, a post member journalled in the front end portion of said beam to extend vertically downwardly therefrom while being rotatable therein, manual lock means for locking said post against rotation relative to said beam, a base plate fixed to the lower end of said post to extend forwardly therefrom and having a wheel axle fixedly connected thereto to extend transversely of said base plate, road wheel means mounted on said axle, compression spring means disposed between said base plate and said beam member to permit cushioned movements of said plate relative to said beam member, vertically standing plate means fixedly attached to the front end of said base plate and having a plurality of vertically aligned apertures therethrough, a tow bar carrying means at its rear end for selective slip-fitted connections into any of said apertures thereby regulating the height of the rear end of the tow bar relative to said base plate, and bearing means carried by the front end of said tow bar for journalled connection upon a tow hook carried by the towing vehicle, said tow bar including an elastic shock absorbing component.

6. In a trailer carriage comprising a vehicle frame supported by ground wheel means and adapted to be hitched to a towing vehicle, the improvement comprising in combination, a forwardly extending beam member carried by the front end portion of said vehicle frame and connected thereto by means permitting manual adjustments of the vertical position of said beam relative to said frame, a post member journalled in the front end portion of said beam to extend vertically downwardly therefrom while being rotatable therein, a base plate fixed to the lower end of said post to extend forwardly therefrom and having a wheel axle fixedly connected thereto to extend transversely of said base plate and beyond the opposite sides thereof, road wheels mounted on the opposite extending ends of said axle, compression spring means disposed between said base plate and said beam member to permit cushioned movements of said base plate relative to said beam member, a pair of vertically standing plates fixedly attached to the front end of said base plate and having a plurality of vertically aligned apertures therethrough, a tow bar carrying means at its rear end for selective slip-fitted connections into any of said apertures thereby regulating the height of the rear end of the tow bar relative to said base plate, and bearing means carried by the front end of said tow bar for journalled connection upon a tow hook carried by the towing vehicle, said tow bar including an elastic shock absorbing component.

References Cited by the Examiner

UNITED STATES PATENTS

| | | | |
|---|---|---|---|
| 2,316,702 | 4/1943 | McDaniel | 280—476 |
| 2,493,405 | 1/1950 | Hedgpeth | 280—476 X |
| 2,523,210 | 9/1950 | Hedgpeth | 280—476 X |
| 2,639,159 | 5/1953 | Milligan | 280—476 |
| 3,035,856 | 5/1962 | Mleczko et al. | 280—490 |

FOREIGN PATENTS 723,758  2/1955  Great Britain.

LEO FRIAGLIA, *Primary Examiner.*